(12) United States Patent
Shen et al.

(10) Patent No.: US 8,574,739 B2
(45) Date of Patent: Nov. 5, 2013

(54) HEAT DISSIPATING DEVICE FOR A BATTERY PACK, AND A BATTERY PACK USING THE SAME

(75) Inventors: Xi Shen, Shenzhen (CN); Jianhua Zhu, Shenzhen (CN); Qing Lai, Shenzhen (CN); Yili Han, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 564 days.

(21) Appl. No.: 12/092,564

(22) PCT Filed: May 8, 2006

(86) PCT No.: PCT/CN2006/000899
§ 371 (c)(1),
(2), (4) Date: May 2, 2008

(87) PCT Pub. No.: WO2007/053992
PCT Pub. Date: May 18, 2007

(65) Prior Publication Data
US 2008/0292949 A1 Nov. 27, 2008

(30) Foreign Application Priority Data

Nov. 8, 2005  (CN) .......................... 2005 1 0115705
Mar. 30, 2006  (CN) .......................... 2006 1 0066527

(51) Int. Cl.
*H01M 2/10* (2006.01)
*H01M 10/50* (2006.01)
*H01M 6/00* (2006.01)
*H01M 10/00* (2006.01)

(52) U.S. Cl.
USPC ................ 429/120; 429/96; 429/99; 429/122

(58) Field of Classification Search
USPC ...................... 429/120, 122, 96, 99
See application file for complete search history.

(56) References Cited

U.S. PATENT DOCUMENTS

2002/0090546 A1* 7/2002 Mu-Tsai et al. .............. 429/120
2003/0017383 A1* 1/2003 Ura et al. ...................... 429/120
2005/0202310 A1* 9/2005 Yahnker et al. ................ 429/62

FOREIGN PATENT DOCUMENTS

CN           2450785 Y       9/2001
CN           1366717 A       8/2002
(Continued)

OTHER PUBLICATIONS

Machine translation of JP 2002134177 A, Hamazaki, May 2002.*
Heat sink. Dictionary.com. Dictionary.com Unabridged. Random House, Inc. http://dictionary.reference.com/browse/heat sink (accessed: Aug. 23, 2010).*
Fixed. Dictionary.com. Dictionary.com Unabridged. Random House, Inc. http://dictionary.reference.com/browse/fixed (accessed: Aug. 23, 2010).*
International Search Report for PCT/CN2006/000899, Mailed Aug. 24, 2006, 2 pages.

*Primary Examiner* — Sean P Cullen
(74) *Attorney, Agent, or Firm* — Blakely, Sokoloff, Taylor & Zafman LLP (57) ABSTRACT

Disclosed herein is a heat dissipating device for a battery pack which comprises a heat pipe and a heat collecting plate comprising a bottom heat collecting plate and an upper heat collecting plate each having a hole therein, wherein two ends of the heat pipe are inserted respectively into the holes in the bottom heat collecting plate and the upper heat collecting plate. A battery using the heat dissipating device is also disclosed. During the operation of the heat dissipating device, since the heat generated by the cells can be collected in the upper heat collecting plate, then transmitted to the bottom heat collecting plate through the heat pipe, and finally dissipated outwardly by the bottom heat collecting plate, the heat generated by cells can be dissipated rapidly and efficiently.

6 Claims, 5 Drawing Sheets

(56) References Cited

FOREIGN PATENT DOCUMENTS

| | | | |
|---|---|---|---|
| CN | 2713633 Y | 7/2005 | |
| JP | 9-326264 A | 12/1997 | |
| JP | 9-326266 A | 12/1997 | |
| JP | 11-329485 A | 11/1999 | |
| JP | 2001-255085 A | 9/2001 | |
| JP | 2002134177 A | * | 5/2002 |

* cited by examiner

HEAT DISSIPATING DEVICE FOR A BATTERY PACK, AND A BATTERY PACK USING THE SAME

CROSS-REFERENCE TO OTHER APPLICATIONS

This is a National Phase of International Application No. PCT/CN2006/000899 filed on May 8, 2006, which claims priority from Chinese Patent Application No. 200510115705.9 filed on Nov. 8, 2005 and Chinese Patent Application No. 200610066527.X filed on Mar. 30, 2006.

FIELD OF THE INVENTION

The present invention relates to a heat dissipating device, and more particularly, to a heat dissipating device for a battery pack and a battery pack using the same.

BACKGROUND

Currently, the battery pack has been widely used in various fields such as the electric vehicles. As the consciousness of environment protection and energy conservation is enhanced, more attention is paid to the development of the electric vehicles. Under such circumstances, the battery pack, as the heart member of the electric vehicles, is becoming the key point in the study of the electric vehicles.

A battery pack may be formed by connecting a plurality of cells in series or in parallel in various ways, and then clamping and fixing the connected cells. The cell may be a conventional alkaline secondary cell, such as Ni—Cd cells, Ni-MH cells and so on, or a lithium-ion cell.

For example, CN 2450785 Y discloses a structure for fastening and assembling rectangular sealed cells which mainly comprises an end plate, a press plate and an insulated partition plate, wherein the cell and the insulated partition plate are placed in alternative manner to form a battery pack; the insulated partition plate is disposed on the outer sides of the both ends of the battery pack, and the end plate is disposed thereto; two press plates are respectively placed at the two sides of the battery pack, and fastened at the mounting position of the two end plates, and then the whole battery pack is fixed closely; and the cells are connected with each other with connecting pieces.

Since the battery pack has a high operating current, it will generate large quantities of heat during its operation. However, in the conventional battery pack, the heat generated by the battery pack could not be dissipated rapidly and efficiently, which will deteriorate the electrochemical property of the battery pack, and even result in some accidents such as battery heating, fire, and explosion.

SUMMARY OF THE INVENTION

An object of the present invention is to provide a heat dissipating device for a battery pack which can rapidly and efficiently dissipate the heat generated by the cells, so as to overcome the disadvantages of the prior battery pack that the generated heat could not be dissipated rapidly and efficiently.

Another object of the present invention is to provide a battery pack using the heat dissipating device.

According to one aspect of the present invention, a heat dissipating device for a battery pack comprises:
a heat pipe; and
a heat collecting plate comprising a bottom heat collecting plate and a upper heat collecting plate which both have a hole formed therein;
wherein, two ends of the heat pipe are inserted respectively into the holes of the bottom heat collecting plate and the upper heat collecting plate.

According to another aspect of the present invention, a battery pack comprises a plurality of cells connected in series or in parallel and further comprises a heat dissipating device which comprises:
a heat pipe; and
a heat collecting plate comprising a bottom heat collecting plate and a upper heat collecting plate which both have a hole formed therein, and between which the cells are interposed;
wherein, two ends of the heat pipe are inserted respectively into the holes of the bottom heat collecting plate and the upper heat collecting plate.

During the operation of the battery pack using the heat dissipating device according to the present invention, since the heat generated by the cells can be collected in the upper heat collecting plate, then transmitted to the bottom heat collecting plate through the heat pipe inserted therein, and finally dissipated outwardly by the bottom heat collecting plate, the heat generated by cells can be dissipated rapidly and efficiently.

DESCRIPTION OF REFERENCE SIGNS

| | |
|---|---|
| 1 heat pipe | 2 heat collecting plate |
| 3 heat dissipating plate | 4 cell |
| 5 supporting frame | 6 bolt |
| 11 bottom heat collecting plate | 12 upper heat collecting plate |
| 13 hole | 14 heat sink |
| 15 connecting piece | 16 beam |
| 17 retaining slot | 18 projection |
| 19 groove | |

DETAILED DESCRIPTION OF THE PREFERRED EMBODIMENTS

Hereinafter, the heat dissipating device for a battery pack and the battery package using the same according to the present invention will be described in detail with reference to the drawings.

Figure 1:
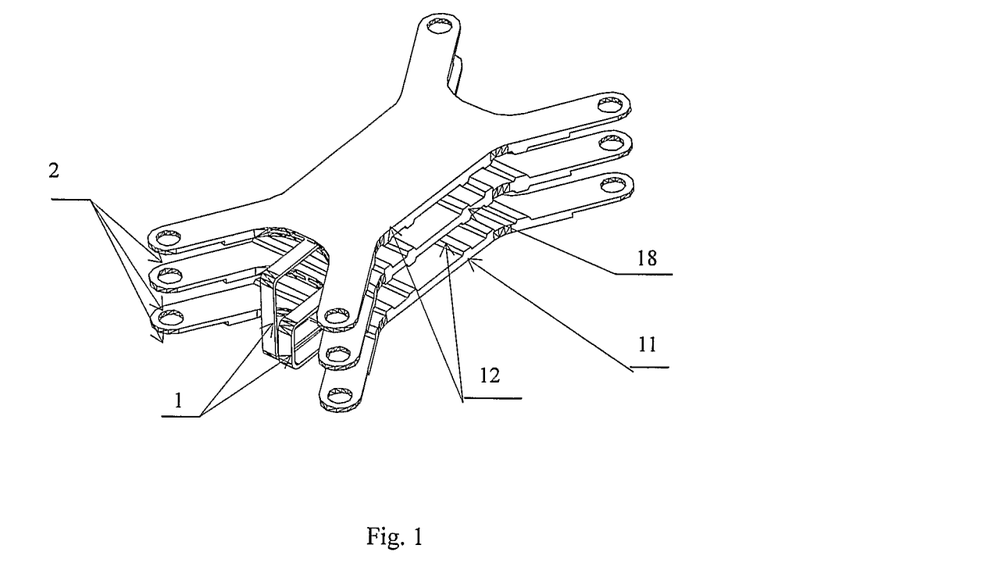
FIG. 1 is a perspective view schematically showing a heat dissipating device for a battery pack according to the present invention.
Figure 2:
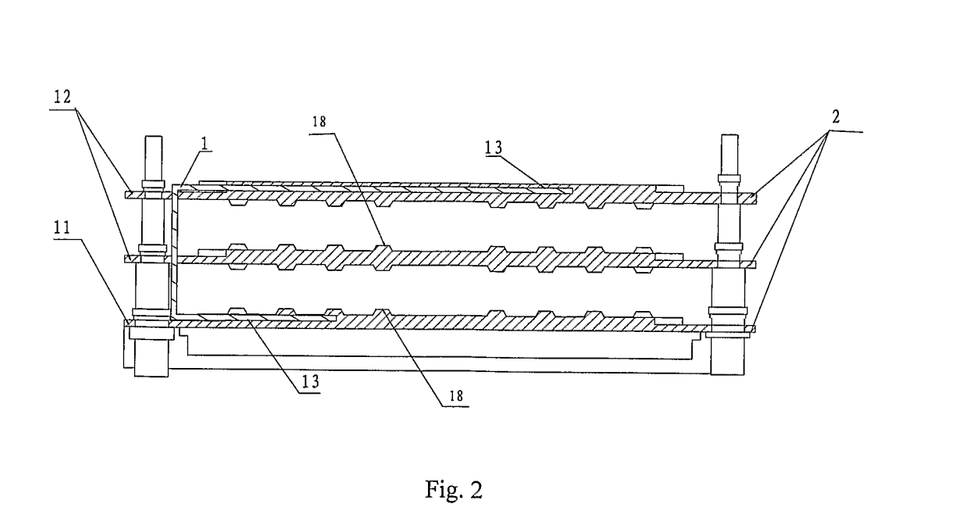
FIG. 2 is a cross sectional view showing a heat dissipating device for a battery pack according to the present invention.

As shown in FIGS. 1 and 2, the present heat dissipating device for a battery pack comprises a heat pipe 1 and a heat collecting plate 2 comprising a bottom heat collecting plate 11 and an upper heat collecting plate 12 each of which has a hole 13 formed therein, and one end of the heat pipe 1 is inserted into the hole 13 of the bottom heat collecting plate 11 and the other end is inserted into the hole 13 of the upper heat collecting plate 12.

According to the present heat dissipating device, the heat pipe 1 is an element with high heat conductivity. The heat pipe is mainly constructed as a closed hollow pipe having a capillary core which contains liquid therein and is extended axially along the inner wall of the pipe. The interior of the pipe is vacuumed previously, so that in the pipe there is only saturated vapor in equilibrium with the liquid. If one end of the heat pipe is placed at a high temperature position, and the other end at a low temperature position, the liquid at one end (hot end) will vaporize rapidly, causing the saturated vapor pressure at the hot end higher than that at the other end (cool end). Then the saturated vapor flows from the hot end to the cool end, condenses at the cool end and releases or dissipates heat of evaporation. And then, the condensed liquid comes back to the hot end by means of the capillary action. Since the heat can be conducted from the hot end to the cold end repeatedly, the heat pipe can be used as an excellent heat conductor.

The present invention does not intend to limit the heat pipe 1 to any specific shapes. According to one embodiment of the present invention, as shown in FIG. 1, the heat pipe 1 may be designed as a U-shaped heat pipe, of which one end is inserted in the hole of the bottom heat collecting plate 11, and the other end is inserted in the hole of the upper heat collecting plate 12. In this embodiment, since the U-shaped heat pipe is used to transmit the heat from the upper heat collecting plate 12 to the bottom heat collecting plate 11, the size of the heat dissipating device can be reduced while the heat is transmitted rapidly and efficiently.

The present invention does not intend to limit the cross-section of the heat pipe 1 to any specific shapes. According to one embodiment of the present invention, the cross-section of the heat pipe 1 may have a rectangular shape, and at this time the cross-section of the holes 13 retaining the ends of the heat pipe may also have a rectangular shape. In this embodiment, since the cross-section of the heat pipe has a rectangular shape, the thickness of the heat collecting plate 2 can be minimized on the premise that there is sufficient contact area between the heat pipe 1 and the heat collecting plate 2 to transmit heat generated by the battery pack, such that it is possible to reduce the whole size of the heat dissipating device and the battery pack using the same; and to increase the energy density of the battery pack.

According to the present invention, the number of the heat pipe 1 is not specially limited, and may be increased or decreased in practice. However, at least one heat pipe 1 should be provided for each upper heat collecting plate 12. If the amount of the heat generated by the battery pack is small, only one heat pipe 1 may be provided for each upper heat collecting plate 12; while if large, two or more heat pipes 1 may be provided. Of course, the more heat pipes are used, the more complicate and expensive the heat dissipating device will become. It is apparent for a person skilled in the art to select an appropriate number of heat pipes in practice.

The present invention does not intend to limit the heat collecting plate 2 to any specific materials. Preferably, the heat collecting plate 2 can be made of the materials with excellent heat conductivity, such as aluminum alloy or copper alloy. The heat collecting plate 2 comprises the bottom heat collecting plate 11 and upper heat collecting plate 12. In the present invention, the number of the upper heat collecting plate 12 is not specially limited, and may be increased or decreased in practice, but preferably is more than one. As shown in FIG. 1, there are two upper heat collecting plates 12.

The present invention does not intend to limit the hole 13 in the heat collecting plate 2 to any specific size. Preferably, the cross-section of the hole 13 is fitting to or slightly bigger than that of the heat pipe 1. The ends of the heat pipe 1 may be coated with a heat conductive silica gel before being inserted into the holes, so as to enhance the connection strength therebetween.

According to the present invention, the number of the hole 13 is not specially limited. Preferably, the number of the holes 13 in each upper heat collecting plate 12 is equal to that of the heat pipes 1 provided for the same, and the number of the holes 13 in the bottom heat collecting plate 11 is equal to the total number of the heat pipes 1 used in the heat dissipating device. If there are a plurality of holes in the bottom heat collecting plate 11, these holes may be designed in parallel with each other. Preferably, these holes may be arranged in parallel at the same or different height based on the bottom surface of the bottom heat collecting plate 11, and preferably at the same height.

According to one preferred embodiment, a projection 18 and/or a groove 19 are provided on the upper surface of the bottom heat collecting plate 11 and on the surface of the upper heat collecting plate 12. The projection 18 and/or groove 19 are provided on one of or preferably both of the surfaces facing to each other of two adjacent heat collecting plates. The projection 18 and/or groove 19 can be provided on one surface or both surfaces of each heat collecting plate. For example, as shown in FIGS. 1 and 2, the projection is provided on the upper surface of the bottom heat collecting plate 11, on the bottom surface of the top upper heat collecting plate 12, and on both surfaces of the middle upper heat collecting plate 12.

As shown in FIGS. 1 and 2, there is projection 18 on the upper surface of the bottom heat collecting plate 11 and on the surface of the upper heat collecting plate 12. The number of the projection 18 is preferably more than one, and these projections 18 are preferably arranged longitudinally in parallel. Where the heat dissipating device is used for a battery pack which comprises a cell having grooves on its surfaces, the projections can mate with the grooves of each cell.

Figure 3:
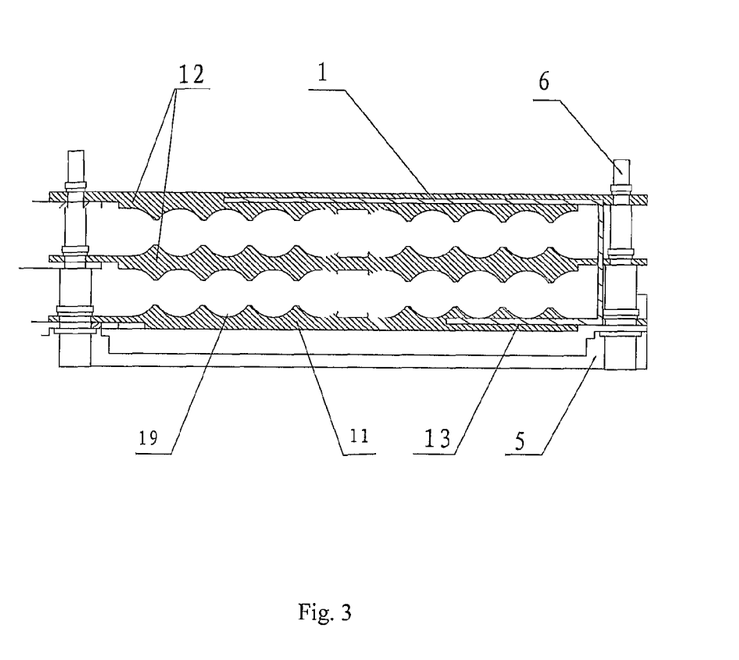
FIG. 3 is a cross sectional view showing another heat dissipating device for a battery pack according to the present invention.

As shown in FIG. 3, there is groove 19 on the upper surface of the bottom heat collecting plate 11 and on the surface of the upper heat collecting plate 12. The number of the groove 19 is preferably more than one, and these grooves are preferably arranged longitudinally in parallel. Where the heat dissipating device is used for a battery pack which comprises a cylindrical cell, the projections can mate with the surface of the cylindrical cell.

During the operation of the present heat dissipating device, the above embodiment can not only provide sufficient contact area between the heat collecting plate and the cell to efficiently transmit heat generated by the cell, but also provide the positioning accuracy and the fix strength when assembling the cell, and as a result both the safety property and the heat dissipating property of the battery pack using the heat dissipating device can be improved.

According to the heat dissipating device of the present invention, a heat dissipating structure, which is a heat sink 14 or a heat dissipating plate 3, may be provided under the lower surface of the bottom heat collecting plate.

The heat sink 14 can increase the heat dissipating area of the bottom heat collecting plate 11, and enhance the heat dissipating efficiency. The number and mounting manners of the heat sink 14 may vary in practice. For example, the heat sink 14 may be longitudinally disposed on the lower surface of the bottom heat collecting plate 11.

A heat dissipating plate 3 may be provided under the bottom heat collecting plate 11, and the upper surface of the heat dissipating plate 3 contacts closely with the lower surface of the bottom heat collecting plate 11, such that the heat can be transmitted efficiently from the bottom heat collecting plate 11 to the heat dissipating plate 3.

Figure 4:
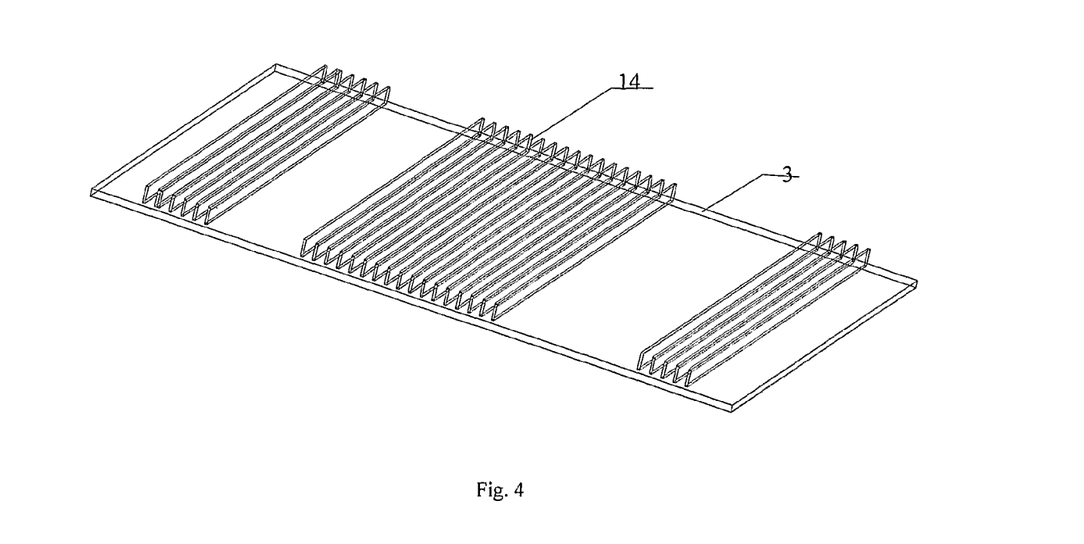
FIG. 4 is a perspective view schematically showing a heat dissipating plate used with a heat dissipating device for a battery pack according to the present invention.

According to the present invention, the heat dissipating plate 3 can be made of various materials with good heat conductivity, for example but not limited to, aluminum alloy and copper alloy. As shown in FIG. 4, the heat sink 14 is provided on the lower surface of the heat dissipating plate 3 to increase the heat dissipating area of the heat dissipating plate 3 and enhance the heat dissipating efficiency. According to the present invention, the number and mounting manners of the heat sink 14 may vary in practice. For example, as shown in FIG. 4, the heat sink 14 may be longitudinally disposed on the lower surface of the heat dissipating plate 3. According to the present invention, the number of the heat dissipating plate is not specially limited, and may be equal to the number of the bottom heat collecting plate.

Figure 5:
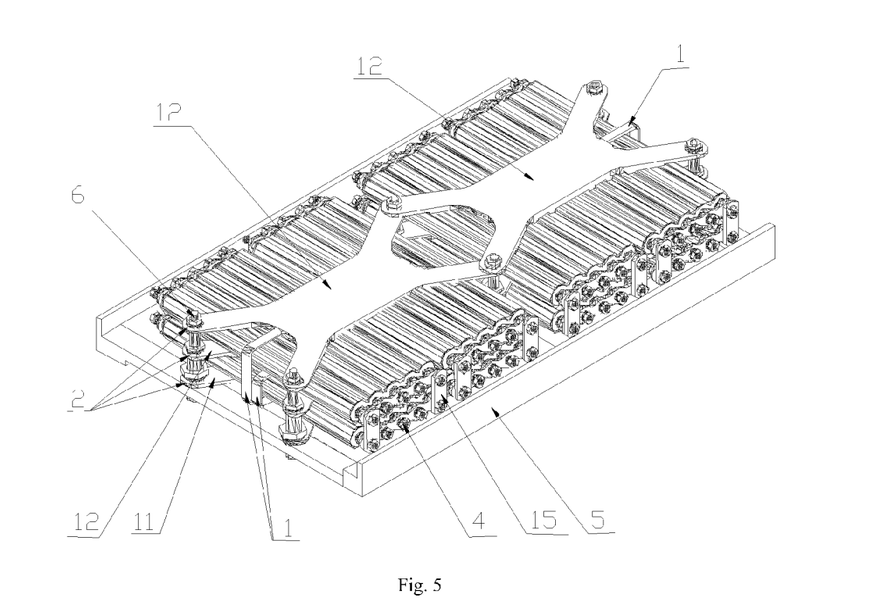
FIG. 5 is a perspective view schematically showing a battery pack according to the present invention.
Figure 6:
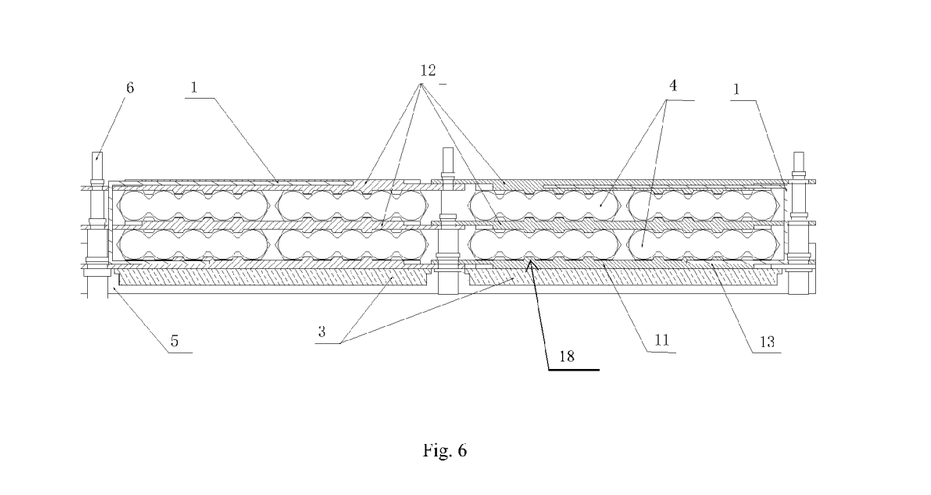
FIG. 6 is a cross sectional view showing a battery pack according to the present invention.

As shown in FIGS. 5 and 6, the present battery pack comprises a plurality of cells 4 connected in series or in parallel and a heat dissipating device which comprises a heat pipe 1 and a heat collecting plate 2. The heat collecting plate 2 includes the bottom heat collecting plate 11 and the upper heat collecting plate 12, and the cell 4 are provided between the bottom heat collecting plate 11 and the upper heat collecting plate 12. The bottom heat collecting plate 11 and the upper heat collecting plate 12 each has a hole 13 therein, and two ends of the heat pipe 1 are inserted respectively into the holes 13 of the bottom heat collecting plate 11 and the upper heat collecting plate 12.

When there are a plurality of upper heat collecting plates 12, the cells 4 are disposed between the bottom heat collecting plate 11 and the adjacent upper heat collecting plate 12, and between two adjacent upper heat collecting plates 12. That is, the cells are disposed between each two adjacent heat collecting plates.

The heat pipe, the heat collecting plate and the hole formed in the plate have been described in detail above, and more details are omitted here.

As shown in FIG. 5, the plurality of cells 4 can be connected in series or in parallel by means of a connecting piece 15 used in the conventional battery pack.

As shown in FIG. 5, the present battery pack may further comprise a supporting frame 5 on which the heat collecting plate 2 may be mounted by any known means. For example, in one embodiment of the present invention, the heat collecting plate 2 and the supporting frame 5 respectively have a through hole therein, and a bolt 6 is provided to insert through the through hole and fastened by a nut. The bolt 6 is preferably a stepped bolt. In this embodiment, each cell 4 is positioned between two adjacent heat collecting plates which are connected by the stepped bolt, such that the cell can be mounted stably between the two plates without any pressure stress to prevent the cells from shifting by the shock of outside force in case of concussion and the like, the short circuit in the battery pack can be avoided, and the mechanical safety of the battery pack is thus enhanced.

Preferably, the contacting surfaces between the cells 4 and the upper and bottom heat collecting plates may be coated with a heat conductive adhesive, which not only enhances the connection strength between the plates and the cells to improve the mechanical safety property of the present battery pack, but also conducts the heat generated by the cells to the heat collecting plate to increase the heat dissipating efficiency. Any known heat conductive adhesive may be used, and preferably heat conductive silica gel is used as the heat conductive adhesive.

Figure 7:
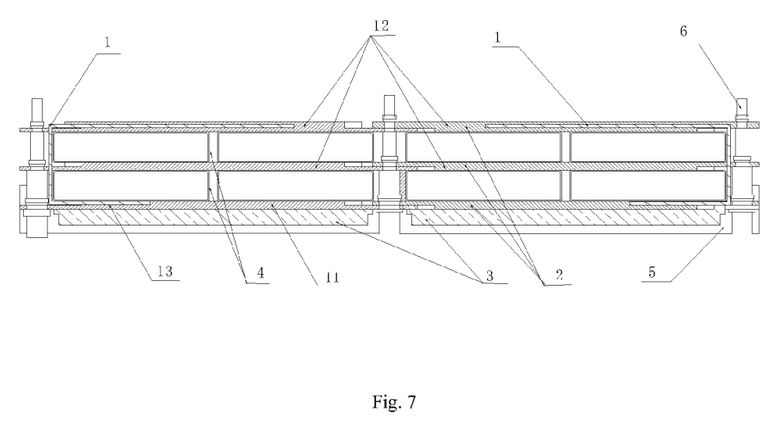
FIG. 7 is a cross sectional view showing another battery pack according to the present invention.
Figure 9:
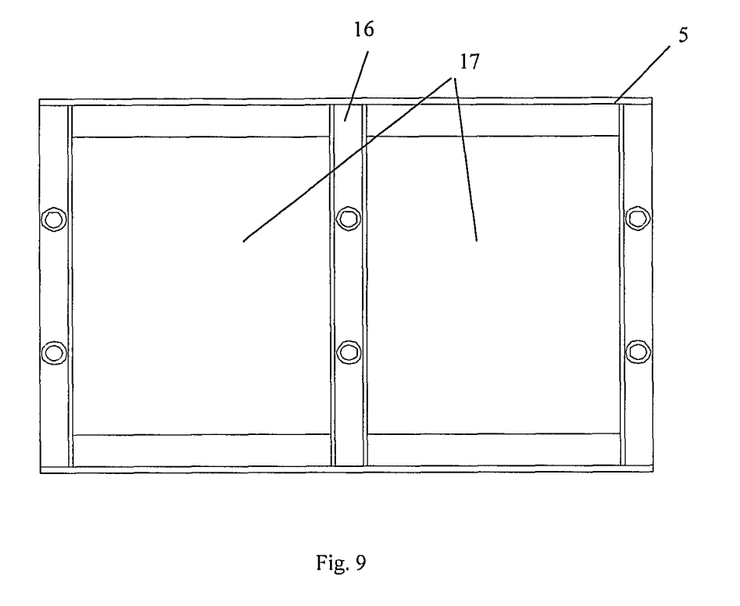
FIG. 9 is a view schematically showing the structure of a supporting frame.

As shown in FIG. 9, the supporting frame 5 may comprise three parallel beams 16 and two fixing grooves 17 between the beams 16. As shown in FIGS. 6 and 7, the heat dissipating plate 3 is provided under the lower surface of the bottom heat collecting plate 11. The heat dissipating plate 3 can be mounted on the supporting frame 5 by means of the fixing groove 17, and then the bottom heat collecting plate 11 is mounted on the heat dissipating plate 3.

According to the present invention, various kinds of cells can be used in the battery pack, for example but not limited to, alkaline secondary cells such as Ni—Cd, Ni—Zn and Ni-MH cells, and lithium-ion cells.

Figure 8:
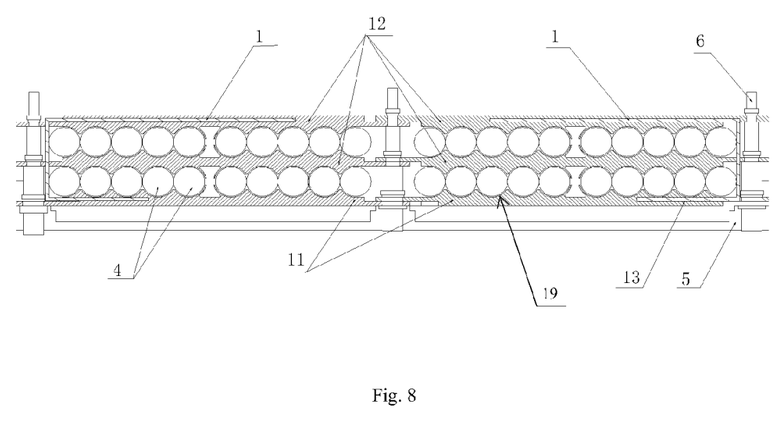
FIG. 8 is a cross sectional view showing yet another battery pack according to the present invention.

The present invention does not intend to limit the cells and the heat collecting plates to any specific number or quantity. As shown in FIGS. 6 and 7, there are 8 cells divided into two layers, 6 heat collecting plates divided into three layers (2 bottom heat collecting plates of one layer, and 4 upper heat collecting plates divided into two layers), and 2 heat dissipating plates. As shown in FIG. 8, there are 40 cells divided into two layers, 6 heat collecting plates divided into three layers (2 bottom heat collecting plates of one layer, and 4 upper heat collecting plates divided into two layers), and 2 heat dissipating plates.

The present invention does not intend to limit the cell to any specific shapes. The cell may be shaped as a hexagonal combined body as shown in FIG. 6, a rectangular single body as shown in FIG. 7, or a cylindrical single body as shown in FIG. 8.

According to one embodiment of the present invention, as shown in FIG. 6, the cell 4 has grooves on its surface, and the bottom heat collecting plate 11 and the upper heat collecting plate 12 have projections 18 mating with the grooves on their surfaces contacting with the cell 4. The projections 18 may be formed on either or both of the opposite surfaces of two adjacent heat collecting plates contacting with the same cell 4, and preferably on both of the opposite surfaces.

According to another embodiment of the present invention, as shown in FIG. 8, the cell 4 is the cylinder single cell, and the bottom heat collecting plate 11 and the upper heat collecting plate 12 have grooves 19 mating with the surface of the cylinder cell. The grooves 19 may be formed on either or both of the opposite surfaces of two adjacent heat collecting plates contacting with the same cell 4, and preferably on both of the opposite surfaces.

In the above two embodiments, there is sufficient contacting area between the heat collecting plate 2 and the cell 4 to transmit the heat generated by the cell, and at the same time the positioning accuracy and the fix strength can be enhanced during assembling the cell.

Hereinafter, the assemble procedure of the battery pack of the present invention will be described with reference to the battery pack shown in FIG. 6.

1, placing two heat dissipating plates 3 respectively into the fixing grooves 17 of the supporting frame 8; inserting six bolts 5 (stepped bolts) through the holes of the beams 16, mounting two bottom heat collecting plates 11 respectively onto the two heat dissipating plate 3 by means of the first stage of the stepped bolts; and then fixing them by fastening the first nuts on the stepped bolts;

2, coating the upper surface of the bottom heat collecting plate 11 with heat conductive silica gel; placing four cells 4 onto the bottom heat collecting plate 11 in alignment with the projections 18 thereon; coating the surface of the cells 4 with heat conductive silica gel; placing two upper heat collecting plate 12 onto the cells 4 in alignment with the grooves of the cells 4; and then fastening the second nuts on the stepped bolts;

3, repeating the above step 2, placing the second layer of cells, placing the upper heat collecting plates onto the second layer of cells, and fastening the third nuts on the stepped bolts;

4, selecting a heat pipe with an appropriate length based on distances between the upper heat collecting plates and the bottom heat collecting plate, and bending the heat pipe into U-shape;

5, coating the surface of the two ends of the U-shaped heat pipe with heat conductive silica gel, and inserting both ends into corresponding holes with predetermined depth in the upper and bottom heat collecting plates before the silica gel hardens;

6, repeating steps 4 and 5, inserting heat pipes coated with silica gel into corresponding holes in other upper heat collecting plates and the bottom heat collecting plate, and maintaining all the heat pipes not interrupt each other;

7, repeating step 6 until all heat pipes are assembled; and 8, connecting all the cells 4 together with connecting pieces 15, to form a battery pack.

What is claimed:

1. A battery pack comprising:
   a plurality of cells connected in series or in parallel; and
   a heat dissipating device, wherein the heat dissipating device includes
      at least one heat pipe;
      a plurality of heat collecting plates including a bottom heat collecting plate and a upper heat collecting plate which both have a hole formed therein, and between which the cells are interposed;
      a supporting frame on which the heat collecting plates are fixed; and
      a heat dissipating structure, wherein the heat dissipating structure is a heat sink or a heat dissipating plate under a lower surface of the bottom heat collecting plate,
      wherein each heat pipe is U-shaped, and one end of each U-shaped heat pipe is inserted into and terminates within one hole of the bottom heat collecting plate and the other end is inserted into and terminates within one hole of the upper heat collecting plate.

2. The battery pack as claimed in claim 1, wherein,
   the plurality of heat collecting plates includes more than one upper heat collecting plate and each upper heat collecting plate has at least one hole;
   the cells are interposed between the bottom heat collecting plate and one adjacent upper heat collecting plate, and between two adjacent upper heat collecting plates; and
   the bottom heat collecting plate has more than one hole formed therein.

3. The battery pack as claimed in claim 2, wherein,
   a number of the holes in the bottom heat collecting plate is equal to a number of U shaped heat pipes; and
   the holes in the bottom heat collecting plate are parallel with each other.

4. The battery pack as claimed in claim 1, wherein, contacting surfaces between the cells and the bottom and upper heat collecting plates are coated with a heat conductive adhesive.

5. The battery pack as claimed in claim 1, wherein,
   the cells have grooves on the surface thereof; and
   the bottom and upper heat collecting plates have projections mating with the grooves on their surfaces contacting with the cells.

6. The battery pack as claimed in claim 1, wherein,
   the cells are cylindrical cells; and
   the bottom and upper heat collecting plates have grooves mating with the surface of the cylindrical cells on their surfaces contacting with the cells.

* * * * *